United States Patent [19]

Stephens

[11] Patent Number: 4,847,785
[45] Date of Patent: Jul. 11, 1989

[54] INTERACTIVE DISPLAY FOR TREND OR BAR GRAPH

[75] Inventor: L. Keith Stephens, Charlottesville, Va.

[73] Assignee: International Business Machines Corp., Armonk, N.Y.

[21] Appl. No.: 692,816

[22] Filed: Jan. 22, 1985

[51] Int. Cl.$^4$ ............................................. G06F 15/62
[52] U.S. Cl. ................................... 364/518; 340/722; 364/521; 346/33 R
[58] Field of Search ............................... 364/518–521; 340/715, 722, 731, 747; 346/17, 18, 33 R, 46

[56] References Cited

U.S. PATENT DOCUMENTS

| | | | |
|---|---|---|---|
| 3,648,270 | 3/1972 | Metz et al. | 340/3 |
| 3,725,901 | 4/1973 | Lehari et al. | 340/722 |
| 4,231,032 | 10/1980 | Hara et al. | 340/703 |
| 4,283,723 | 8/1981 | Bickley et al. | 340/722 |
| 4,303,973 | 12/1981 | Williamson et al. | 340/103 |
| 4,307,393 | 12/1981 | Hamada et al. | 340/722 |
| 4,375,079 | 2/1983 | Ricketts et al. | 364/518 |
| 4,603,396 | 7/1986 | Washizuka et al. | 364/520 |
| 4,609,918 | 9/1986 | Nakanishi et al. | 364/518 |
| 4,622,641 | 11/1986 | Stephens | 364/518 |
| 4,642,790 | 2/1987 | Minshull et al. | 364/521 X |
| 4,665,501 | 5/1987 | Saldin et al. | 364/521 X |
| 4,695,976 | 9/1987 | Nakanishi et al. | 364/520 X |

Primary Examiner—Gary V. Harkcom
Assistant Examiner—H. R. Herndon
Attorney, Agent, or Firm—C. Lamont Whitham; Michael E. Whitham

[57] ABSTRACT

A system for the interactive control of a display such as a CRT (cathode ray tube) or the like, produces a visual representation of at least one variable in the form of a trend or bar graph. The system includes a personal computer having a cursor control and a display. The system operator can select a variable for display, and then select a location within which the visual representation of the variable is to appear and a range of the variable which is to be displayed within the selected region. The system responds to the operator's selections for producing a visual representation in the form of a trend or bar graph of the selected variable within the selected range at the operator-selected location.

18 Claims, 10 Drawing Sheets

LINKAGE CREATION

DISPLAY TREND OR BAR CHART

INTERACTIVE DISPLAY FOR TREND OR BAR GRAPH

RELATED APPLICATIONS

This application is related to the following co-pending applications, assigned to a common assignee, which are incorporated herein by reference:

Application Ser. No. 499,458, filed May 31, 1983 by Lawrence K. Stephens and entitled "Schematic Building Cursor Character", now U.S. Pat. No. 4,672,575 issued June 9, 1987;

Application Ser. No. 499,452, filed May 31, 1983 by Lawrence K. Stephens and entitled "Current Cursor Symbol Demarkation", now U.S. Pat. No. 4,555,772 issued Nov. 11, 1986;

Application Ser. No. 499,453, filed May 31, 1983 by Lawrence K. Stephens and entitled "Moving Eraser for Graphic Screen", now abandoned;

Application Ser. No. 499,451, filed May 31, 1983 by Lawrence K. Stephens and entitled "Text Placement on Graphics Screen", now U.S. Pat. No. 4,627,015 issued Dec. 2, 1986.

Application Ser. No. 531,651, filed Sept. 13, 1983, by Lawrence K. Stephens and entitled "Geometrical Display Generator", now U.S. Pat. No. 4,622,641 issued Nov. 11, 1986.

Application Ser. No. 531,650, filed Sept. 13, 1983, by Lawrence K. Stephens and Robert E. Hayes and entitled "Monitoring and Alarm System for Custom Applications", now U.S. Pat. No. 4,644,478 issued Feb. 17, 1987.

Application Ser. No. 531,774, filed Sept. 13, 1983, by Lawrence K. Stephens and Robert E. Hayes and entitled "Display System for Monitoring and Alarm System", now U.S. Pat. No. 4,588,987 issued May 13, 1986.

TECHNICAL FIELD

The present invention relates to such a system for producing trend or bar graph displays, and more particularly such a system which is interactive.

BACKGROUND ART

Trend and bar graph displays provide a readily understood representation of numeric data. A bar graph for example can illustrate the current value of one or more scalar variables. A trend illustrates several scalar values of a variable as a function of an independent variable. One typical trend display is to plot the scalar values of a variable as a function of time, although other independent variables may also be used.

Trend and bar graphs were in the past laboriously plotted by hand. More recently, trend and bar graphs were automated to the extent that graphics printers were used to produce hard copy representations of trend and bar graphs. Plotting trends and bar graphs on video display terminals is also within the scope of the prior art. Early examples of producing trend or bar graph information on a video display terminal can be found in Metz et al 3,648,270 for Graphic Display System and Lehari et al 3,725,901 for Method and Apparatus for Representing Measured Values on the Screen of a Video Apparatus. Both patents describe electronic circuits which when associated with a video display terminal can be used to provide trend and bar graph information.

Later devices providing for trend and bar graph displays use or are associated with digital computers or digital processors, see in particular Bickley et al 4,283,723; Williamson, Jr. et al 4,303,973; Hamada et al 4,307,393; Hara et al 4,231,032 and Ricketts et al 4,375,079.

To the extent that devices disclosed in the aforementioned patents produce trend or bar graph displays, those displays are presented in a format, orientation and size which is predetermined. In some cases, see for example Williamson, Jr. et al 4,303,973, the operator can select particular variables for display, and in some cases even select the number of different variables which will be displayed, see the selection described in col. 20 for selecting 1–4 variables in a quarter-screen format, or up to 2 variables in a half-screen format. It should be apparent, however, that this limited flexibility does not provide a display system suited in many applications.

For example, an operator may desire to display a bar graph or trend of a single scalar variable, but also include unique graphics associated with the bar or trend display. Depending upon the particular graphics employed, the operator may desire the bar graph or trend to be located at any point on the display and occupy any selected sub-region of the display area. The prior art does not teach a system which allows the operator to freely select the location of a trend or bar display as well as to freely define the extent of the region of the display which will be occupied by the trend or bar graph (from 0% to 100%). Likewise, the operator may desire to produce a display based on more than a single scalar variable with the trend or bar graph of each variable located independently of other variables and of a size which is independent of the size of the trend or bar graph for other variables.

Typical systems for generating displays of trend or bar graph information have in the past included a mainframe computer, a large bulk memory system including tape units, rigid disk units and removable disk pack units, high resolution cathode ray tube (CRT) displays, a large random access memory (RAM) of sufficient capacity to store the graphics information and address each pixel of the high resolution display, and input/output (I/O) devices such as sensors, digitizer pads with cursors and plotters. These systems are very expensive but that cost could be justified because of the extreme capability. More recently the prices of such large systems have come down significantly due to economies of computer and memory system manufacture, and because of that such systems are being applied to a wide variety of applications. Nevertheless, large-scale systems are still quite expensive and their use is generally limited to correspondingly expensive applications. For example the system described in the Williamson, Jr. et al patent is arranged to control a large-scale industrial process.

At the other end of the spectrum are the so-called personal computers based on microprocessors which have been developed over the past decade. These typically comprise a mother board containing the microprocessor, a read only memory (ROM) encoded with a basic input/output system (BIOS) for controlling the microprocessor, a limited amount of RAM and a number of adpaters for interfacing with various I/O devices. These I/O devices may include a Keyboard, a medium or high resolution CRT display, one or more floppy disk drives, and a printer such as one of the more popular dot matrix printers. Although personal computers are small and compact, they are capable of some fairly sophisticated applications. They are especially well-suited to business applications such as accounting, data base management and business analysis. Recently, a number of business applications have been developed which include graphic support. These applications take the input or calculated numerical data and produce line graphs, bar charts and pie charts which are much easier to interpret than the raw numerical data. Prints of these graphical dislays are made by reading out the data shown on a CRT to a dot matrix printer provided with a graphical capability or to an inexpensive pen plotter. The latter device is also capable of generating tansparencies for use in overhead projectors. The acceptance of business applications with graphic support has been immediate and substantial, with the result that there is a considerable demand for graphics applications which are not necessarily limited to business graphics. The ability to generate schematic diagrams, flow charts, floor plans, and similar graphic displays would be highly desirable in the production of technical manuals, advertising layouts and the like. The presentation of trend and bar graphs is one element in satisfying the demand. However, this ability should be accompanied by the flexibility to locate the trend or bar graph, at will, and to freely select the portion of the total display which will be occupied by the trend or bar graph.

SUMMARY OF THE INVENTION

It is therefore an object of the invention to provide an inexpensive and interactive display system for producing visual representations of bar graphs or trends which is based on the personal computer.

It is another object of the invention to provide such a system for personal computers which is easy to use and facilitates the generation of special purpose displays which may include schematic diagrams, flow charts and other free-form graphic displays.

It is another object of the invention to provide such an interactive graphic display system for personal computers which is operated by keyboard or joy stick and supports a dot matrix printer or inexpensive plotter.

In accordance with the invention a system for interactive control of a display device to produce a visual representation of at least one variable includes a personal computer with a display device to be controlled and a cursor control for allowing an operator to freely position a cursor, the display device including a display region within which any display is produced, the system further comprising a first means for selecting a particular variable, operator controlled means for selecting a location for said visual representation of said selected variable within said display region, operator controlled means for selecting a range of said variable to be displayed within said display region and means responsive to the first means and to both said operator controlled means for producing a visual representation of the selected variable within the selected range at the operator selected location. In accordance with the invention the operator controlled means for locating the visual representation further includes means for selecting a sub-region within the display region, within which sub-region the visual representation is contained. In accordance with the invention the visual representation of the selected variable can be either a bar graph or a trend. The system also includes scaling means responsive to an operator selected range and to operator selected sub-region for scaling at least one sample of the selected variable to display a representation of the sample within the sub-region. In accordance with the invention visual representations of more than one sample may be displayed, and the operator may freely select a location for each visual representation, and the extent of the sub-region over which the visual representation of each of the different variables will extend.

BRIEF DESCRIPTION OF THE DRAWINGS

The present invention will be further described in the following portions of this specification when taken in conjunction with the attached drawings in which like reference characters identify identical apparatus and in which.

DESCRIPTION OF THE PREFERRED EMBODIMENT

Figure 1:
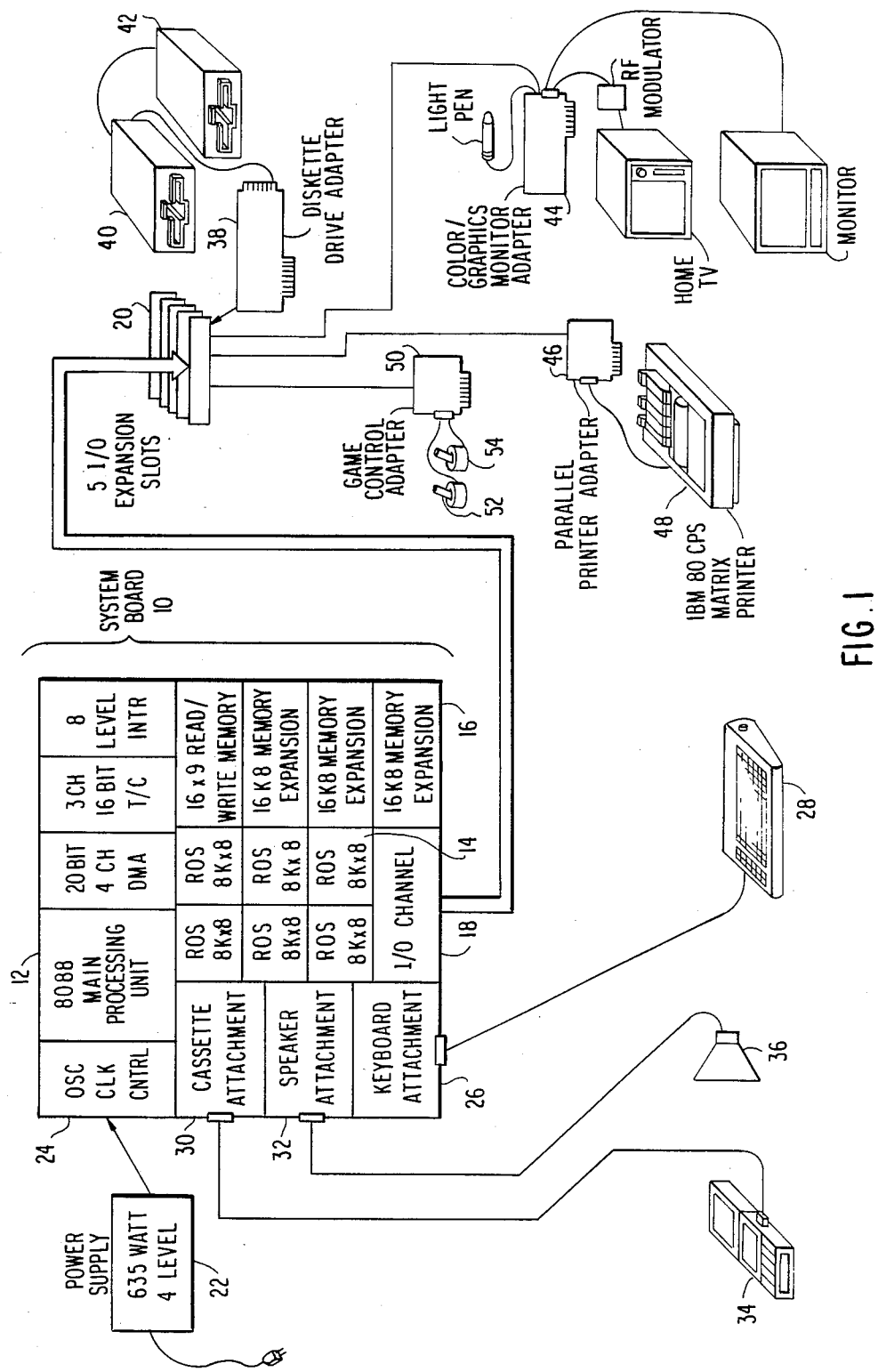
FIG. 1 is a schematic showing of a typical personal computer for implementing the invention.

In order to better understand the invention, a typical personal computer will be first described with reference to FIG. 1 of the drawings. The system or mother board 10 includes a microprocessor 12, ROM 14, RAM 16, and an I/O channel 18 which includes a number of I/O expansion slots 20 for the attachment of various options. The power supply 22 provides power to the mother board 10 and the attached options. The mother board 10 in addition includes a crystal oscillator, clock and control circuits 24 and a keyboard attachment 26 to which a keyboard 28 is attached. In addition the mother board may also include other attachments such as a cassette attachment 30 and a speaker attachment 32 to which are connected a cassette recorder 34 and a speaker 36, respectively. The expansion slots 20 are designed to receive any of the various adapter printed circuit cards shown in the figure. More specifically, a diskette drive adapter 38 may be plugged into one of the slots 20. This adapter 38 is required to support one or more diskette drives 40 and 42. A color/graphics monitor adapter 44 may also be plugged into one of the slots 20, and this adapter supports either a home color TV or a RGB nonitor and a light pen. A parallel printer adapter 46 may be plugged into another one of the slots 20 to support, for example, a dot matrix printer 48. Finally, a gain control adapter 50 can be plugged into a remaining one of the slots 20 to support one or more joy sticks 52 and 54. Other adapters may be plugged into the slots 20.

Figure 2:
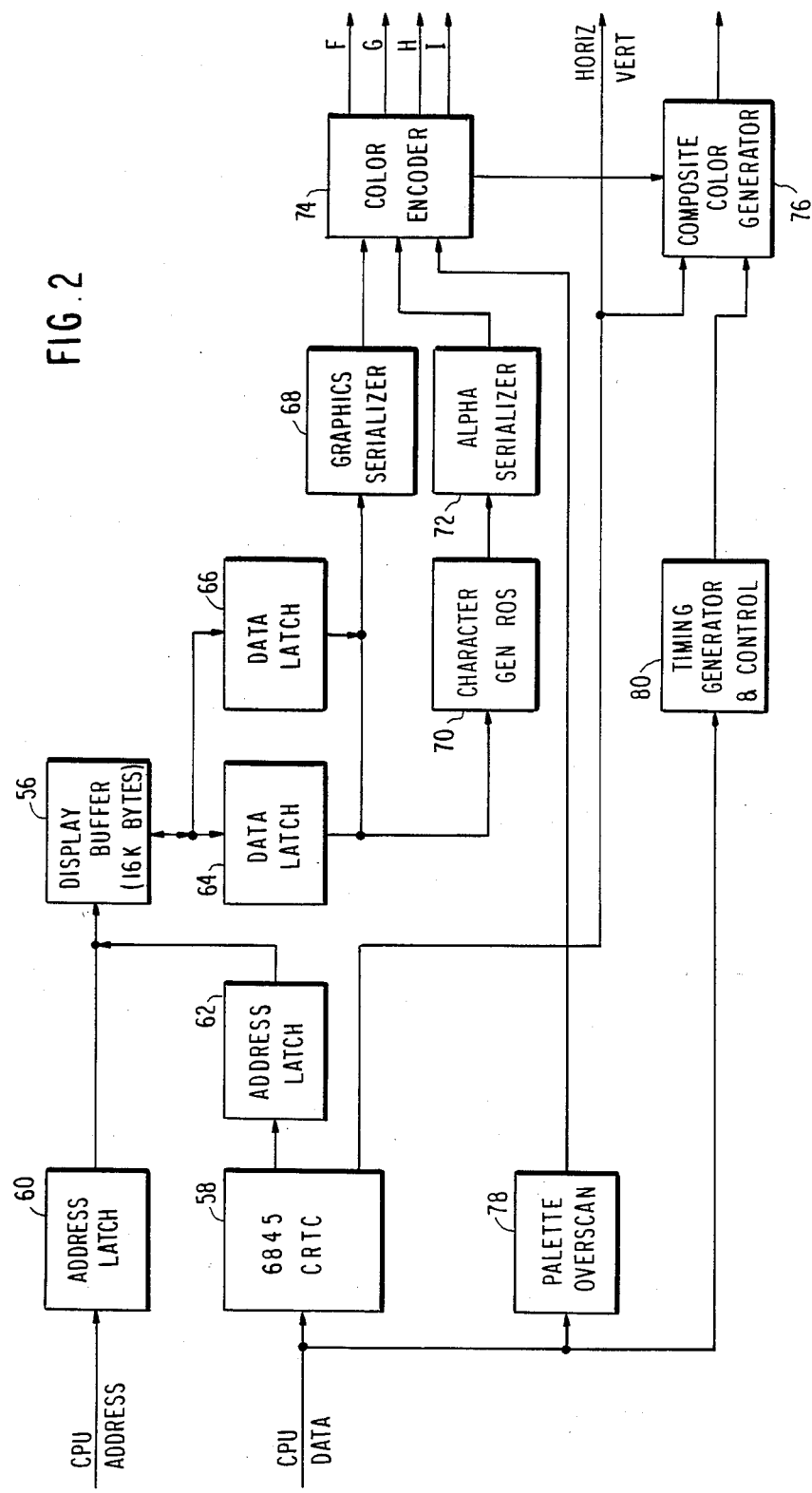
FIG. 2 is a block diagram of a portion of the personal computer of FIG. 1 illustrating the apparatus used to produce the display.

The color/graphics adapter 44 two basic modes of operation; alpha-numeric (A/N) and APA. In both modes, A/N characters are defined in the character box and formed from a ROM character generator containing dot patterns for standard ASCII characters. FIG. 2 is a block diagram of the adapter 44 which contains a display buffer 56 and a CRT controller device 58 such as a Motorola 6845 IC. The controller device 58 provides the necessary interface to drive a raster scan CRT.

The display buffer 56 can be addressed by both the CPU and the controller device 58 through address latches 60 and 62, respectively. Data is read out of the display buffer through data latches 64 and 66 which provide outputs to a graphics serializer 68 and a character generator comprising ROM 70 and an alpha serializer 72. The outputs of the serializers 68 and 72 are provided to the color encoder 74 which either drives a RGB monitor directly or provides an output to the composite color generator 76 that drive a home color TV. The color encoder 74 also receives the output of the pallet-/overscan circuit 78 which provides intensity information. The composite color generator 76 receives horizontal and vertical sync signals from the CRT controller device 58 and timing control signals from the timing generator and control circuits 80. The timing generator and control circuits also generate the timing signals used by the CRT control device 58 and the display buffer 56 and resolves the CPU and contoller contentions for accessing the display buffer.

As will appear below the invention will be described using conventional cursor control for selecting or defining various parameters in the display. However, those skilled in the art will understand that if desired, joy stick control can be substituted for use of the cursor keys on the keyboard. Joy stick control apparatus is described in co-pending Stephens application Ser. No. 499,451, now U.S. Pat. No. 4,627,015 filed May 31, 1983, and entitled "Text Placement on Graphic Screen".

Figure 3:
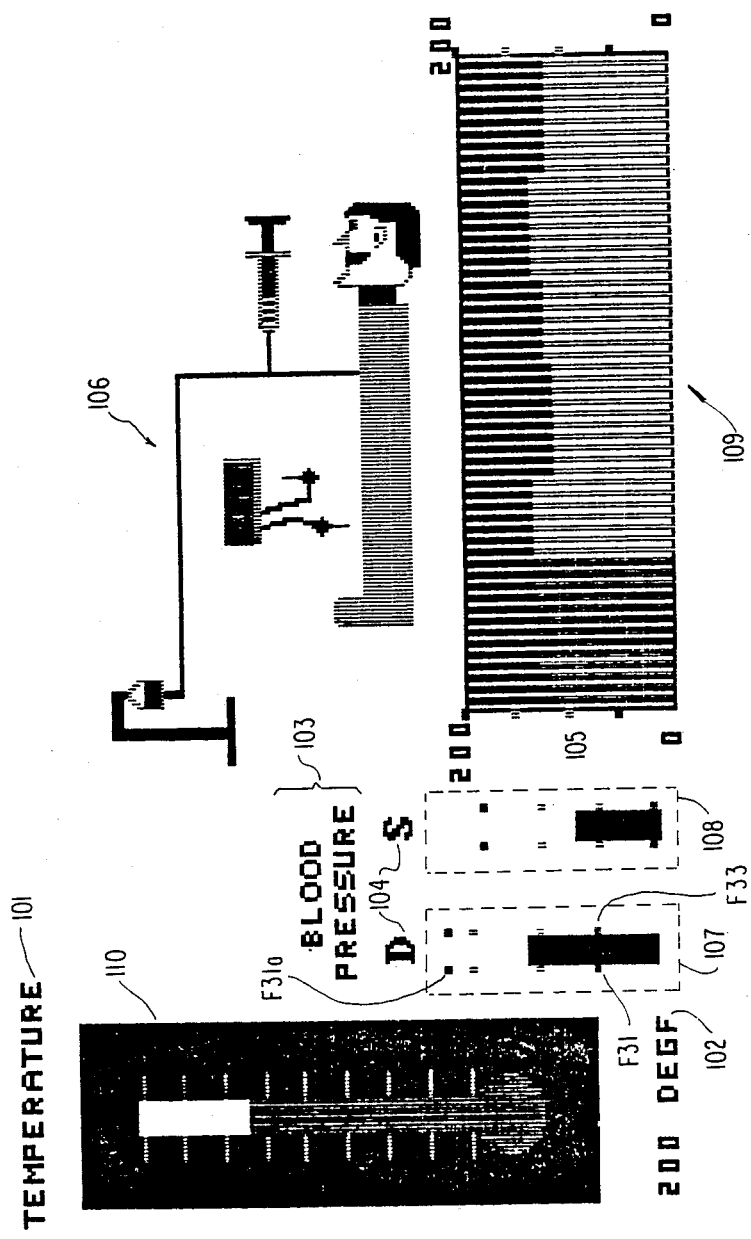
FIGS. 3 and 4 show two typical displays produced by use of the invention.

FIG. 3 is a typical illustration of a display produced in accordance with the present invention. FIG. 3 shows a display with a number of elements, it includes a number of textual legends (101-105), a schematic representation of a real-world event 106, two bar graphs 107 and 108, a trend graph 109, and a schematic representation of a thermometer 110. Methods and apparatus used to produce the display (other than the bar graphs 107, 108 and trend graph 109) are described in the co-pending applications referred to above. The present applications is concerned with producing the bar graphs 107, 108 and the trend graph 109.

The schematic representation 106 illustrates a patient giving blood, whose temperature and blood pressure are being monitored. Monitoring blood pressure produces a time sequence of two variables, diastolic and systolic blood pressure, and each of these is shown in real time by an associated bar graph 107 for diastolic and 108 for systolic blood pressure. The trend chart 109 shows variation of diastolic blood pressure as a function of time. The illustration of FIG. 3 shows an important advantage of the invention in that the bar graphs and trend display can firstly be freely located by a machine operator at any location in the display, and the sub-region of the display occupied by the trend or bar graph can also be selected by the operator. With this capability then the operator can associate the trend or bar graphs either with other trend or bar graphs, or with other elements to quickly convey pertinent information as represented on the display.

Figure 4:
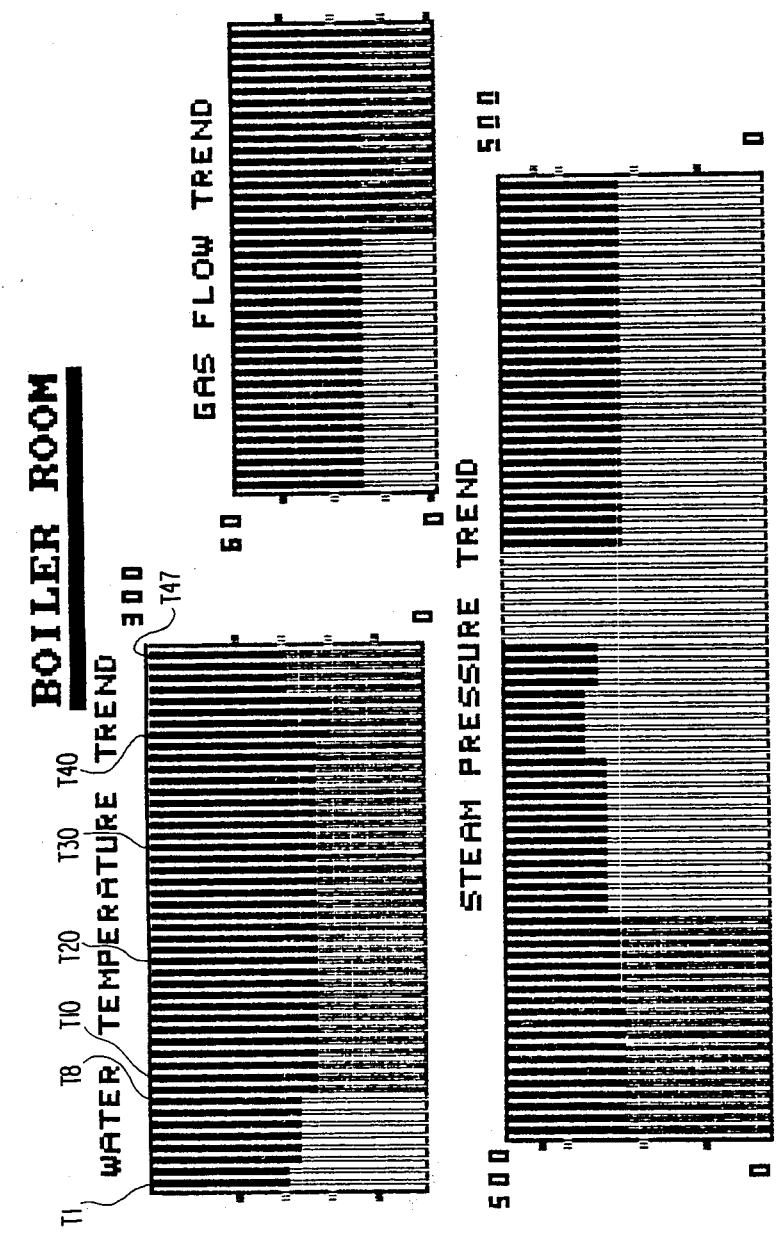

FIG. 4 is another illustration of a display created in accordance with the invention. This includes a plurality of textual legends "Water Temperature Trend", "Gas Flow Trend" and "Steam Pressure Trend". For each trend, numerical quantities are indicated, and alarm limits are also shown. FIG. 4 also shown how the trend graph indicates to the observer the latest data, by the use of a color change. More particularly, taking for example the water temperature trend, the number of trend elements depends on the display sub-region the operator selected for filling with the particular trend, (in the example described herein each trend element requires three pixels). As will be described below, as the variable associated with the trend changes, a new trend element is created and displayed to show the latest value of the variable, previous values also remaining on the screen. When a number of elements has been created corresponding to the total width of the selected sub-region, trend creation reverts to the left portion of the trend to overwrite the oldest data with the new data. Thus as shown in FIG. 4 the water temperature trend includes trend elements T1 through T47. Trend elements T1 through T8 are of a first color whereas trend elements T9 through T47 are of a second color. Thus the viewer can readily determine that T8 is the most current data, and that the data represented by T1 is more current than the data represented by T47 and finally that the data represented by T9 is the oldest data on the display. The manner in which this color switching is effected is described below in connection with FIG. 9.

The software, which is explained below, maintains a dynamic display table, in RAM. The dynamic display table includes a number of entries for each element in the display. Pertinent to the invention are those elements in the dynamic display table corresponding to bar graphs and/or trends. For both bar graphs and/or trends, the dynamic display table identifies a particular variable (or variables) whose magnitudes will be represented on the display, and in addition, the current value for that variable. The trend displays both the current and previous samples of a variable. The samples used in developing the trend diplay are stored in the dynamic display table. The dynamic display table also identifies the location, in the display region, at which the bar graph or trend display is located. The dynamic display table will also store the operator selected colors (if used) for the different elements of the bar graph and/or trend. The bar graph requires a single color to identify the value of the variable, the trend display requires two color pairs for reasons which will be described below.

The display buffer 56 (see FIG. 2) is used to actually drive the display, and the software employs the dynamic display table in order to generate the information to write to the display buffer 56. As will be described below, when I initially produce a display including a bar or trend graph, the entire bar graph or trend graph is written. Thereafter, as the variable being displayed changes in magnitude, only the changes are rewritten to the display buffer, those portions of the display which are unchanged, remain unchanged in the display buffer.

Figure 5:
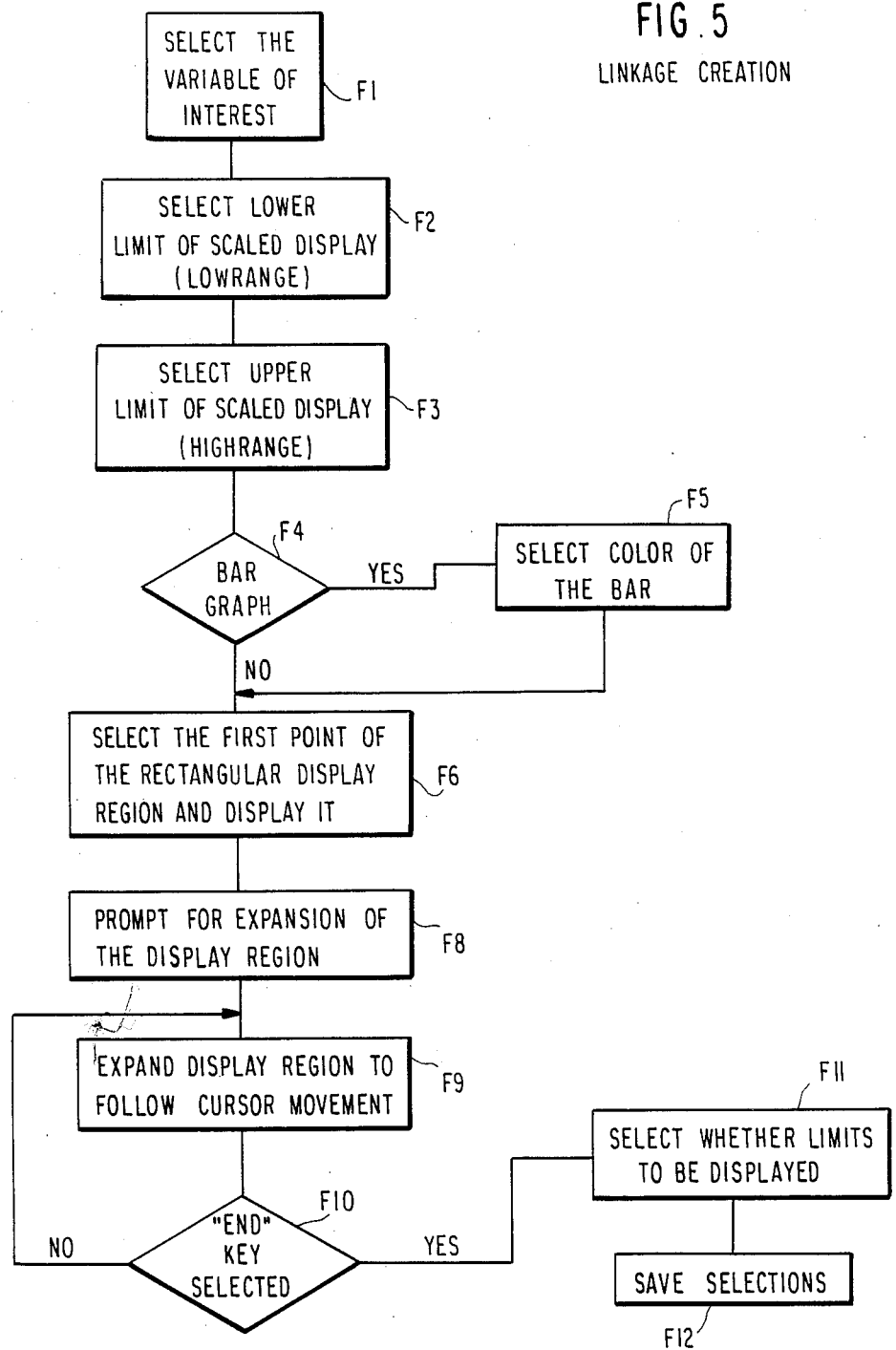
FIGS. 5–10 are flow charts of the processing by the personal computer of FIG. 1 which is one embodiment of the invention.

FIGS. 5-10 illustrate a flow chart in accordance with the invention. Referring now to FIG. 5, FIG. 5 illustrates those functions necessary to select the particular form of display (bar or trend), associate the selected variable or variables, and for each variable select the range of the variable which will be included in the display.

Function F1 is employed to select a particular variable for display. In this and other functions, selection is usually implemented by presenting the operator with a massage identifying the selection to be made, and echoing the operator's selections via the keyboard to the display. Thus, function F1 produces a message on the display asking the operator to identify a particular variable. Function F2 asks the operator to select a lower limit of the scaled display, e.g. the lowest limit of the variable which he desires to be displayed. Function F3 asks the operator to select the upper limit of the scaled display, e.g. how high in magnitude will a varible be displayed?Operator responses, which may be keyed in via the keyboard are stored for later use.

Function F4 asks the opertor to select either the bar or trend graph. If the operator selects the bar graph, then funtion F5 asks him to slect a color of the bar. Either after the operator has selected the bar color, or in the event of a trend display, the operator is then asked (F6) to select the first point of the display region which will be used for the bar or trend graph. This is accomplished by the operator positioning the cursor at the location. The operator can signal that the cursor is now at the desired position by operating a selected key such as the "enter" key or an "end" key. Function F6 then uniquely identifies the operator selected point on the display itself, this allows the operator to distinguish the selected point from the cursor. The next function, F8, produces a prompt requesting the operator to indicate the size of the desired sub-region of the display region which will be used for displaying the trend or bar graph. Typically, the sub-region will be rectangular so that it can be uniquely defined by defining the other end point of a diagonal of the rectangular area. The operator selected first point is one end point of the diagonal and therefore the operator can completely identify the desired sub-region by locating the cursor at the other end point of the diagonal. Thus as the operator moves the cursor in response to the prompt put up by function F8, function F9 continually illustrates to the operator the currently selected sub-region (that is the region that would be selected if the operator terminated the cursor movement at this point). Function F10 continually monitors operation of the selection key (for example the "end" key. If the function identifies operation of that key, then the operator has completely selected the sub-region which will be used for the trend or bar graph. Thereafter, function F11 puts up a prompt asking the operator to identify whether or not alarm limits should be displayed for the selected variable. In the event that the operator responds by identifying that alarm limits should be displayed, then additional prompts are put up asking the operator to identify the upper and lower alarm limits. The operator responds by identifying the analog values' upper and lower alarm limits. In an operating embodiment of the invention the alarm selection included selection of upper and lower warning limits, as described below. Thereafter, functions F12 saves the information identified by the operator throughout functions F1-F12 for use in the dynamic display table. Accordingly, in the course of executing functions F1-F12, the operator has selected a particular variable for a trend or bar graph, has identified whether it should be a trend or bar graph, has selected the upper and lower limits that he wishes displayed, identified the sub-region within which the display should exist, and identified whether or not alarm limits should also be displayed along with the magnitude of the variable. With the selected sub-region for one trend or bar graph still illustrated on the display, the operator can input additional selections for another trend or bar graph so that the display will include more than one trend or bar graph, and as is illustrated by FIG. 3 the display can include both a trend and bar graph of the same or different variables.

Figure 6:
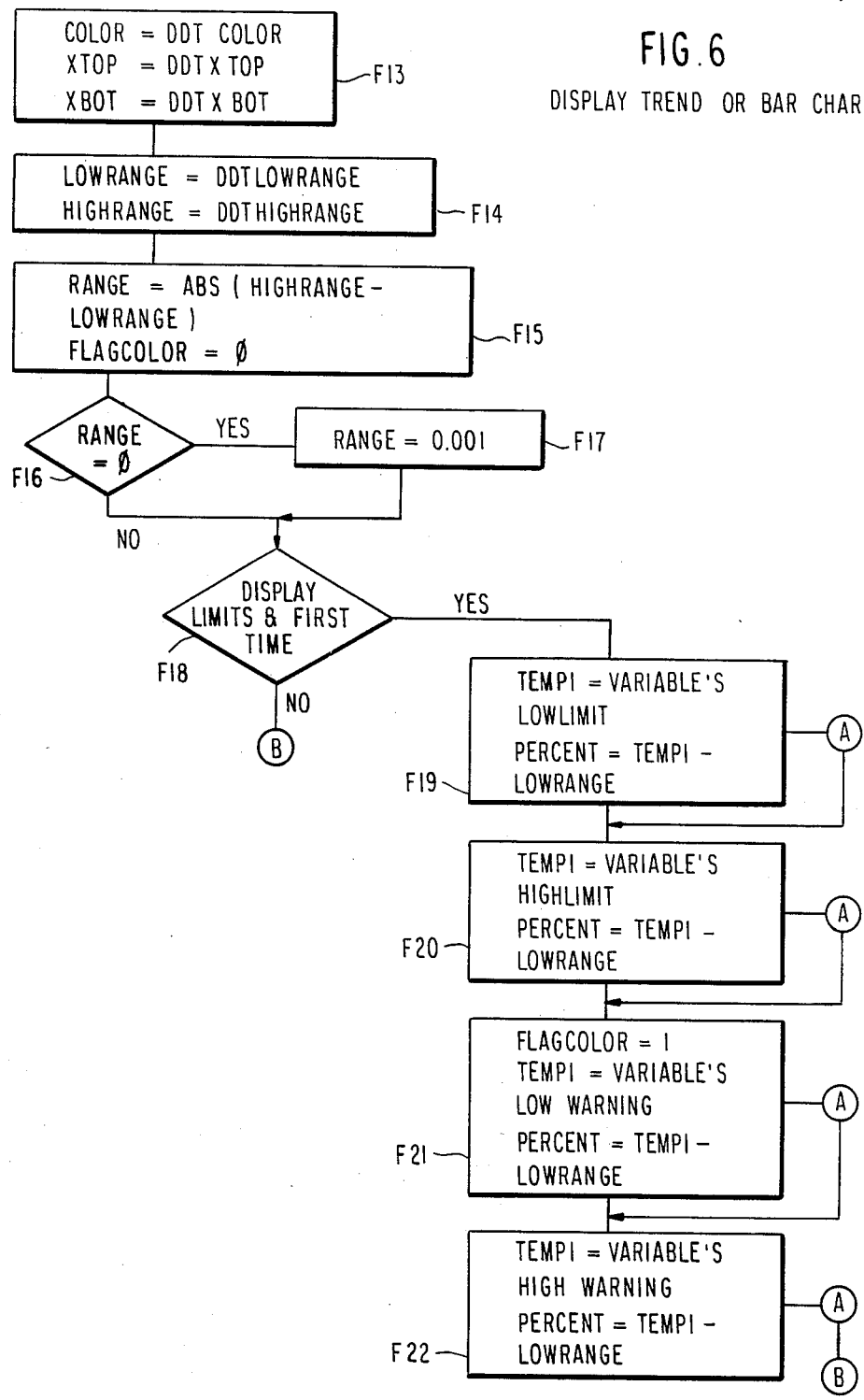
Figure 11:
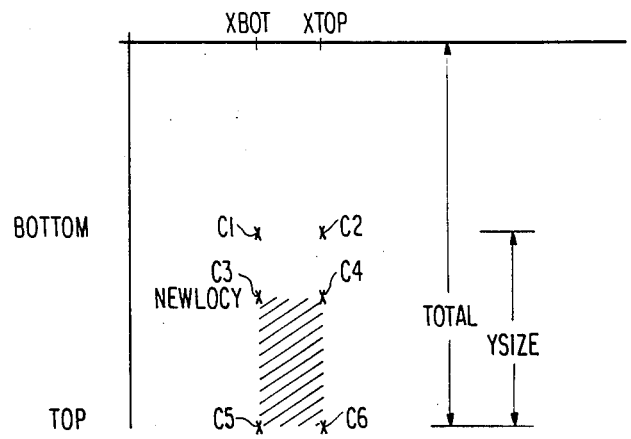
FIGS. 11–13 illustrate a typical bar graph, and the manner in which it is rewritten in the event the variable whose magnitude is illustrated on the bar graph either increases or decreases, respectively.

FIG. 6 illustrates functions F13-F22 which are performed at least once for each trend or bar graph. As will now be described, functions F13-F15 handle scaling of the display and functions F19-F22 are performed to handle location of both the upper and lower alarm and warning limits, if selected by the operator. Function F13 sets three variables based on information obtained from the dynamic display table. The variable COLOR is set to the color identified in the dynamic display table. The variable XTOP is set to the value XTOP extracted from the dynamic display table. This value is one of the values identified by the operator in selecting the sub-region of the display which will be used for the trend or bar graph. The value XBOT is the corresponding value extracted from the dynamic display table set by the operator when identifying the limits of the sub-region which will be used for the trend or bar graph. XTOP and XBOT are shown in FIG. 11 in relation to a typical display, and described below.

Function F14 sets the values LOWRANGE and HIGHRANGE from the corresponding values extracted from the dynamic display table. Of course these are the operator selected high and low limits selected in response to functions F2 and F3. Thereafter, function F15 computes the parameter RANGE as the absolute value of the difference between HIGHRANGE AND LOWRANGE. A further parameter FLAGCOLOR is set to zero (corresponding to black). Function F16 checks to see if the range is equal to zero, if it is, function F17 sets the range to some small but positive number. (This avoids a problem of attempting to divide by zero, as will be described later if the parameter RANGE had been erroneously set to zero).

Figure 7:
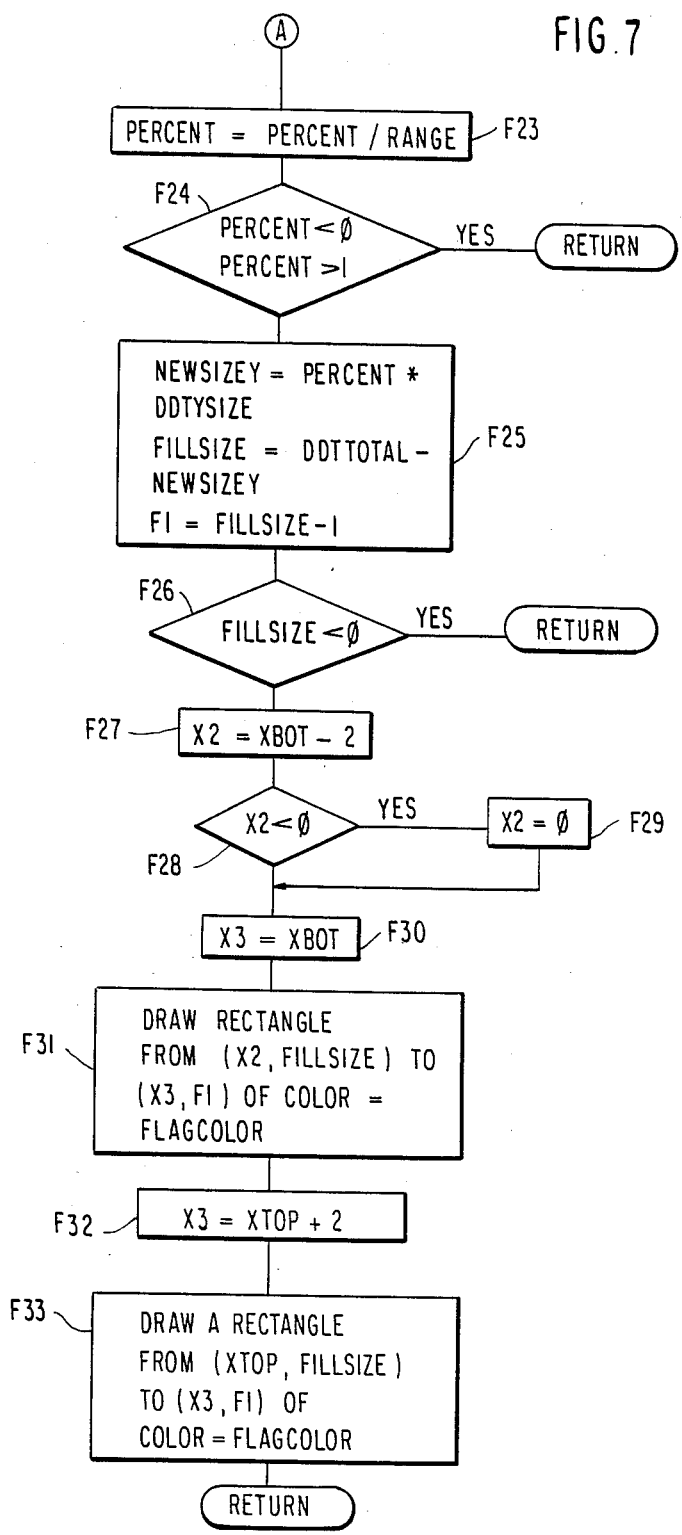

Function F18 determines if this is the first time through this portion of the routine and the operator has selected displaying limits. If both are true, then functions F19-F22 need to be performed, otherwise the program skips to the processing shown in FIG. 8. Assuming that this is the first time through and the operator has selected the option to display alarm limits, then function F19 is performed. Function F19 sets a variable TEMP1 to the variable lower alarm limit selected by the operator at function F11. The function also computes the parameter PERCENT as the difference between TEMP1 and LOWRANGE. At this point processing skips to function F23 (see FIG. 7). As shown in FIG. 7, the quantity PERCENT is updated by dividing the old PERCENT by the quantity RANGE. (It should be apparent that the use of PERCENT in function F19 is merely a temporary storage location since a true percent is not calculated until function F23.) Function F24 checks to see if the updated PERCENT is less than 0 or greater than 1. If it is, that is an error condition and a return is effected at this point. Assuming there is no error condition, however, a new parameter NEWSIZEY is computed by obtaining the product of PERCENT and DDTYSIZE. The quantity DDTYSIZE is obtained from the dynamic display table. It had been computed when the operator selected the size limits of the sub-region to be used as the display of the trend or bar graph. Function F25 also computes the quantity FILLSIZE as the difference between DDTTOTAL and NEWSIZEY. Since the operator can select the sub-region within which the trend or bar graph to be displayed is located as anywhere within the display, the quantity NEWSIZEY indicates the distance from the bottom of the trend or bar graph to the lower alarm limit for the variable, it does not locate that value. Therefore, the quantity FILLSIZE is determined as the difference between DDTTOTAL and NEWSIZEY, DDTTOTAL is measured from a reference position and therefore the quantity FILLSIZE determines the distance from the reference position to the lower alarm limit point. Function F25 also determines the quantity F1 as shown in FIG. 7. Function F26 ensures that FILLSIZE is not less than zero. Function F27 computes X2 as the difference between XBOT (the location of the left-hand portion of the trend or bar graph) and 2 (this will be used to draw an alarm limit which is two pixels in the X direction). Function F28 ensures that X2 is not less than zero, and if it is function F29 sets it equal to zero. Function F30 sets X3 to XBOT. Function F31 draws a rectangle from the point (X2, FILLSIZE) to (X3, F1). This rectangle is two pixels in the X direction (since the difference between X2 and X3 is two), and one pixel in the Y direction (since the difference between FILLSIZE and F1 is unity). Referring momentarily to FIG. 3, the rectangle drawn by F31 is identified as F31 in FIG. 3. Function F32 then modifies X3 to XTOP (the right-hand termination of the trend or bar graph) plus two. Function F33 then draws the alarm limit on the right side of the trend or bar graph. This is identified as F33 in FIG. 3.

At the complettion of function F33 a return is made (to function F20, see FIG. 6). At function F20, the quantity TEMP1 is a changed to the variable's high limit. Thereafter, functions F23-F33 are again performed, and this time the alarm limit identified as F31A is written (in FIG. 3). On returning from function F33, function F21 is performed to again change the quantity TEMP1. The time TEMP1 is set to the low warning value. Functions F23-F33 are repeated to draw rectangles on the left and right corresponding to the variable's low warning value. Finally function F22 sets TEMP1 to the high warning value and functions F23-F23 draw the corresponding left and right rectangles.

Figure 8:
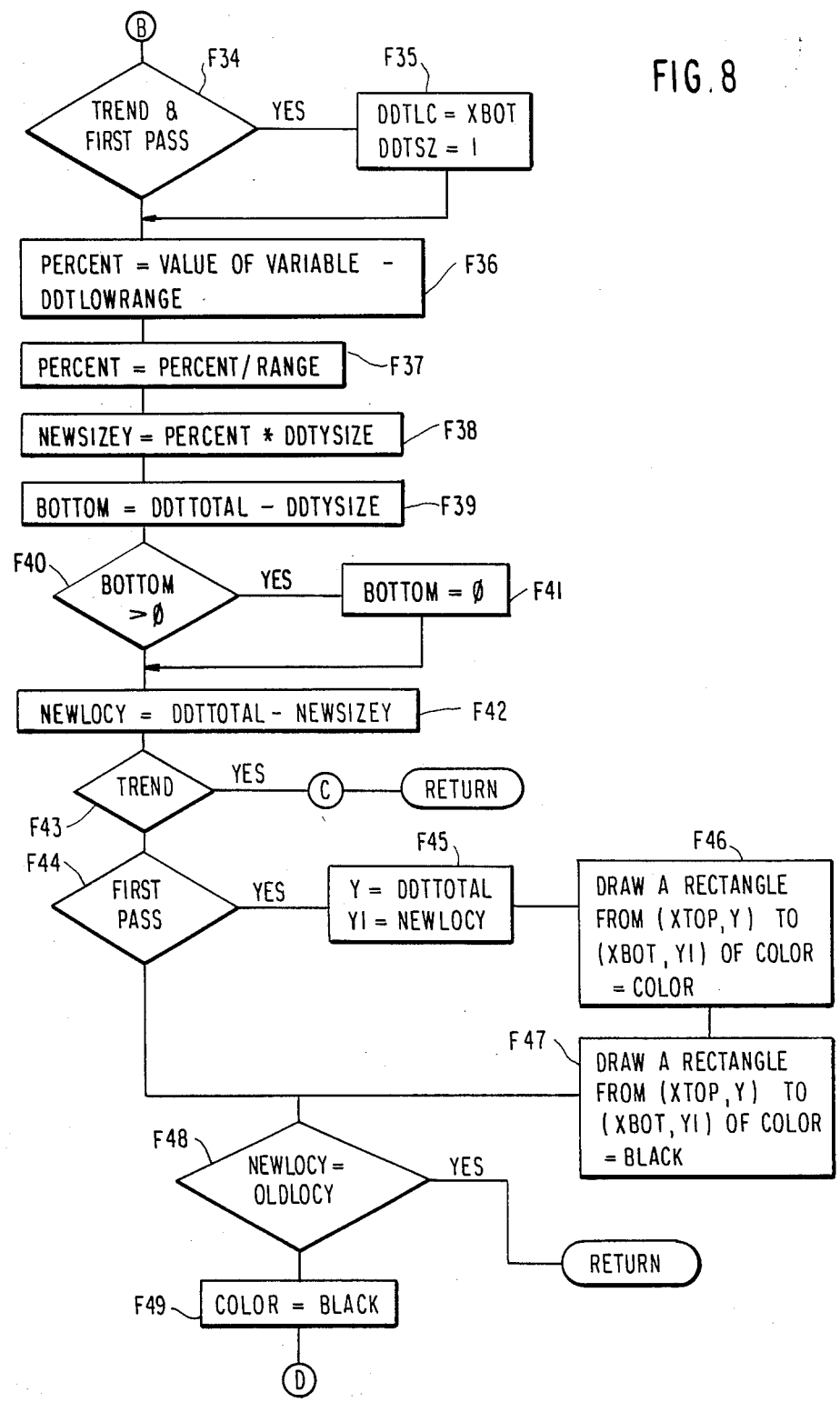

Once the alarm limits have been written, or if no alarm limits are to be written, then processing skips from function F18 (FIG. 6) to function F34 (FIG. 8).

Figure 12:
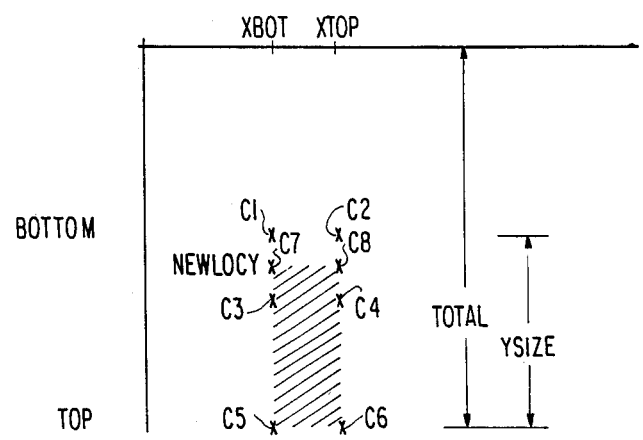
Figure 13:
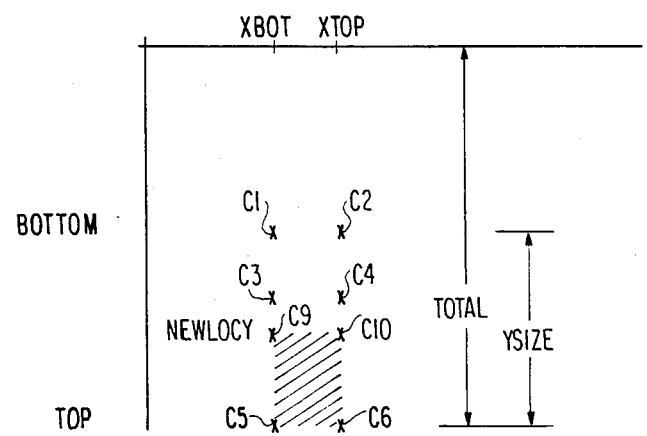

The processing shown in FIG. 8 and following relates to drawing an indicia on the display (for either a trend or a bar graph) whose extent in the vertical direction indicates the magnitude of the variable associated with the trend or bar graph. FIG. 11 shows a typical display within which the sub-region encompassed by the points C1-C6 will be used to produce either an element of a trend graph or a bar graph. The points C1 and C6 (or C2 and C5), when selected by the operator, define the sub-region of the display which will be employed. The horizontal distance that this sub-region is displaced from the left margin of the display is termed XBOT, and is stored in the dynamic display table as DDT XBOT. Similarly, the horizontal distance of the points C2, C4 and C6 from the left-hand margin of the display is termed XTOP and stored in the display table as DDT XTOP. In addition, the operator selected region has a certain vertical height, YSIZE, stored as DDTYSIZE. A second parameter is associated with the display table, DDTTOTAL which indicates the distance from the upper margin of the display to the bottom of the trend or bar graph. Having defined the overall extent of the trend or bar graph (C1-C6) the magnitude of the variable, as displayed, depends on the precentage of the variable compared to its range (the variable magnitude divided by range). This determines the point NEWLOCY. In order to draw the bar graph then, the display must draw a rectangle (C3, C4, C5, and C6) of the color selected by the operator and then must must draw a second retangle (C1, C2, C3, C4) of black color. Since the bar graph may be displaying a variable whose magnitude changes, FIGS. 12 and 13 show how a display once written, is rewritten to illustrate changes in the variable's magnitude. FIG. 12 illustrates the case when the magnitude has increased. Thus the height of the bar (previously C3-C5) is now C7-C5. Thus, when rewriting the display of FIG. 12 (starting from FIG. 11) a rectangle of the bar graph's color must be rewritten consisting of C3, C4, C7, C8. This new rectangle overrides a previously black region. On the other hand, FIG. 13 shows the variation in the bar garph (starting at FIG. 11) in the event that the magnitude of the variable has decreased. In this case the magnitude of the variable (previously C3-C5) is now C9-C5. Thus, the rectangle C3, C4, C9, C10 must be rewritten in black.

At function F34 the processing determines if this is the first time through and we are writing a trend display. If so, the parameter DDTLC is loaded from XTOP (the location of the trend) and the parameter DDTSZ loaded with the quantity one indicating the color black. Function F36 then computes PERCENT as the difference between the present value of the variable (obtained from DDT) and the quantity DDT LOWRANGE. Function F37 then recomputes PERCENT by dividing the old value by RANGE. Function F38 computers NEWSIZEY by obtaining the product of PRECENT and DDTYSIZE. Function F39 computes BOTTOM by obtaining the difference between DDTTOTAL and DDTYSIZE. Function F40 ensures that BOTTOM is not less than zero, and if it is, it is made equal to zero at F41. Function F42 computes NEWLOCY by determining the difference between DDTTOTAL and NEWSIZEY.

Figure 9:
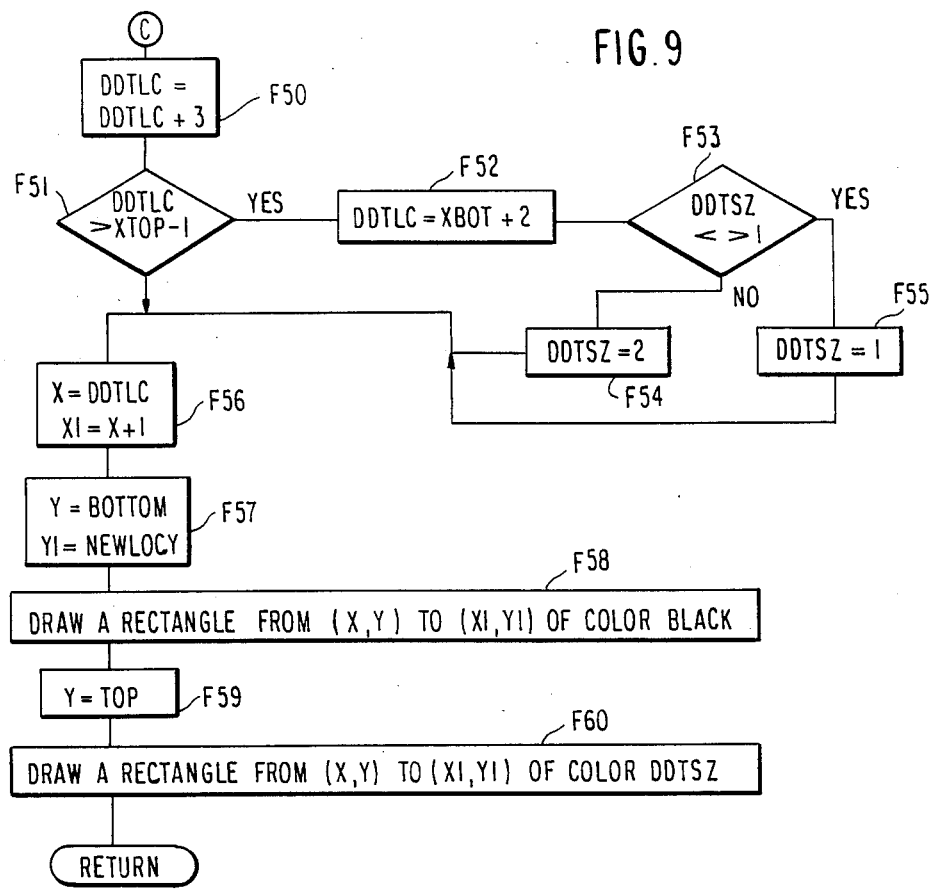
Figure 10:
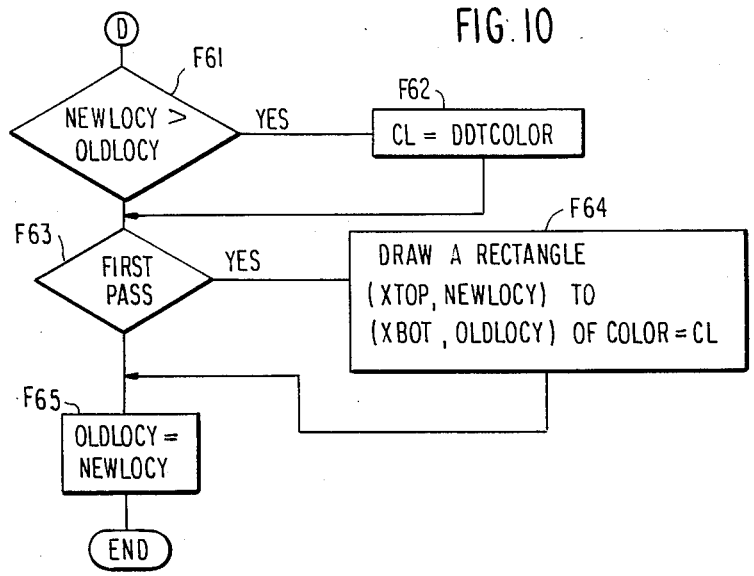

Function F43 checks to see if this is a trend plot, and if it is it skips to the processing shown in FIG. 9. At this point we will assume that we are preparing a bar graph and thus processing falls through to function F44 to determine if this is the first pass. Since it is, parameters Y and Y1 are defined as shown in function F45. Function F46 draws a rectangle as shown. The reader can verify that this is the rectangle (C3, C4, C5, C6) on FIG. 11. Then function F47 draws a second rectangle (C1, C2, C3, C4) of FIG. 11. The reader can also verify that the rectangle drawn at function F47 is indeed C1-C4. Function F48 checks to see if the new location equals the old location. If we were first drawing this bar graph that would not be the case and therefore function F49 is preformed to set the color equal to black and processing skips to point D (FIG. 10). If the bar graph is first being drawn, the processing of FIG. 10, (functions F61-F65) is insignificant except to the extent that function F65 sets the parameter OLDLOCY to the parameter NEWLOCY. Once this is accomplished, on subsequent passes function F36-F42 will compute the NEWLOCY (assuming that the variable has changed in magnitude) and function F44 when performed will indicate this is not the first pass and therefore function F48 will be performed. At this point it is significant that function F48 determines if NEWLOCY is the same as OLDLOCY, since if it is there is no rewriting necessary. On the other hand, if rewriting is necessary then function F49 sets the color to black and the rewriting is accomplished at functions F61-F64. More particularly, function F61 checks to see if the NEWLOCY is greater than OLDLOCY. If that is true then we must rewrite as shown in FIG. 12, and therefore function F62 necessarily switches the parameter color to the color of the bar graph. On the other hand, if NEWLOCY is less than OLDLOCY then we do not want to switch the color because we want to rewrite using black (FIG. 13). Function F63 determines if this is the first pass with this new magnitude and if it is function F64 draws the appropriate rectangle of the color of the bar graph. On the other hand, if NEWLOCY was less than OLDLOCY then we would not want to switch color, therefore function F62 is not performed, function F64 is performed and a new rectangle is drawn black. Thereafter function F65 update OLDLOCY to prepare for the next pass or change in the magnitude of the variable.

Processing for a trend display is different from the bar graph in a number of respects. In the first place, drawing a trend graph actually requires us to draw several bar graphs parallel to each other. In addition, the operator cannot specify the width of the bars in the trend graph, rather each element in the trend graph is two pixels wide, with a one pixel separation between adjacent trend elements. Obviously this is merely exemplary and other choices are within the scope of the invention. As will see when the processing is reviewed in detail, I provide for that number of trend elements which are defined by the operator's selection (XBOT, XTOP), using three pixels per trend element. When I have filled the operator selected region, we switch colors and start at the beginning, rewriting the trend graph. Because of the switch in color an observer can readily distinguish the oldest displayed data from the newest.

Turning now to FIG. 8, when processing trend information function F34 may determine that this is the first pass and therefore the parameters DDTLC and DDTSZ are set as illustrated (DDTSZ is merely a color selection). Functions F36–F42 are performed in the same fashion as they are for a bar graph. However, when we reach function F43 we skip over to the processing shown in FIG. 9. As shown in FIG. 9 function F50 updates DDTLC. Function F9 (FIG. 5) had written a rectangle around the display sub-region selected for the trend (this is only accomplished for the trend display). DDTLC is updated here (F50) before the first trend element is written to avoid overwriting the rectangle written by F9. Function F51 checks DDTLC v. XTOP-1. If DDTLC is greater then we must start at the beginning, but at this point we will assume that it is not and therefore function F56 is performed to set the parameters X and X1 as shown. Function F57 sets parameters Y and Y1 as shown and function F58 draws a rectangle from DDTLC, BOTTOM (which corresponds to the point C1) to DDTLC+1, NEWLOCY (which corresponds to C4) of black color. Function F59 changes Y to YTOP and then function F60 drawings a new rectangle from DDTLC, YTOP (corresponding to point C5) to C4, of the selected color DTSZ. Both rectangles are two pixels in width.

On the next pass the same operation is repeated except that DTLC has been incremented by three (function F50). This provides for a one pixel space between elements. After a sufficient number of passes to draw a sufficient number of trend elements has occurred so that DDTLC is greater than XTOP-1 (function F51) function F52 resets DTLC. Function F53, F55 then changes DTSZ and the process is again repeated, with the new color.

I claim:

1. A system for interactive control of a display device to produce a dynamic visual representation of at least one monitored variable, said system comprising a personal computer with a display to be controlled and operator input means including a cursor control device, said display device including a display region within which any display is produced, said system further comprising:
   first means including said operator input means for selecting a monitored variable to be displayed,
   first operator controlled means, including said cursor control device, for selecting a location of said visual representation of said selected variable within said display region,
   second operator controlled means for selecting a range of said variable to be displayed within said display region, and
   means responsive to said first means and to said first and second operator controlled means for producing a visual representation of said selected variable, within said selected range at said operator selected location.

2. The system of claim 1 in which said operator controlled means for selecting a location of said visual representation further includes means for selecting a sub-region within said display region within which said visual representation is contained.

3. The system of claim 2 which further includes:
   scaling means responsive to an operator selected range and to operator selected sub-region for scaling at least one sample of said selected variable to display a representation of said sample relative to said operator selected range within said subregion.

4. The system of claim 1 in which said visual representation is a trend of said selected variable.

5. The system of claim 4 in which said trend represents n most recent samples of said selected variable and in which after n samples are obtained and displayed additional recent samples replace older samples.

6. The system of claim 1 which includes second means for selecting a bar or trend graph display, and in which said means responsive to said first means and to said first and second operator control means, procuces a bar graph or trend in response to operator control of said second means.

7. The system of claim 6 which includes bar graph rewriting means, responsive to a change in said particular variable for rewriting only that portion of said sub-region representing a change in said particular variable.

8. The system of claim 1 which further includes third operator controlled means for selecting a range of said variable within which said variable will be displayed, and in which said means responsive is also responsive to said third means.

9. The system of claim 8 in which said visual representation is a trend of said selected variable.

10. A system for interactive control a display device to produce a dynamic visual repressentation of art least one monitored variable, said system comprising a personal computer with a display device to be controlled and operator input means including a cursor control device, said display device including a display region within which any display is produced, said system further comprising:
   first means including said operator input means for selecting a variable to be displayed,
   first operator controlled means, including said cursor control means, for selecting a location of said visual representation of said selected variable within said display region, second operator controlled means for selecting a size of a sub-region within which said visual representation will be contained, and means responsive to said first means and to said first and second operator controlled means for producing a visual representation of said selected variable at said operator selected location and within said operator selected sub-region.

11. A process for user interactive generation and the dynamic display of at least one monitored variable in the form of a bar graph or a trend graph composed of a plurality of parallel bar graphs on a graphics display screen comprising the steps of:

prompting the user to select a monitored variable to be linked to a graph representing the value of said variable;

prompting the user to select limits of a scaled display of said graph;

prompting the user to select a region of the screen for display of said graph;

responding to user inputs selecting a monitored variable, limits of a scaled display and a region of the screen for display of said graph by saving defining said selections;

prompting the user to select a variable range to be displayed by said graph;

calling said saved values and drawing a rectangle within said region on said screen having said limits and labeled with said range; and filling said rectangle to a point corresponding to a value of said monitored variable.

12. The process according to claim 11 futher comprising the steps of:

prompting the user to select a background fill color for said rectangle; and responding to the user's selection by filling said rectangle with said background fill color above said point corresponding to said value of said monitored variable.

13. The process according to claim 11 further comprising the steps of:

prompting the user to select attributes of said monitored variable for displaying on said screen including a color representing said variable; and filling said rectangle with said attribute color to said point corresponding to said value of said monitored variable.

14. The process according to claim 13 further comprising the steps of:

prompting the user to select an attribute of warning values of said monitored variable; and labeling said rectangle with said warning values.

15. The process according to claim 11 wherein said graph is a trend graph and further comprising the step of periodically repeating the steps of drawing a rectangle within said region and filling a newly drawn rectangle to a point corresponding to a current value of said monitored variable, each said rectangle being parallel and adjacent other rectangles to generate said trend graph.

16. The process according to claim 15 further comprising the steps of:

testing to determine if a rectangle to be drawn will exceed limits specified by said user for said region; and if so, overwritting an oldest rectangle on said screen within said region with a new rectangle and thereafter overwritting the oldest rectangle with a new rectangle so that the trend graph is condined to said region on said screen with the most recent values of said monitored variable.

17. The process according to claim 16 further comprising the step of changing an attribute of said new rectangle and succeeding new rectangles to differentiate between the most recent value and the oldest value of said monitored variable displayed by said trend graph.

18. The process according to claim 17 wherein said attribute is color.

* * * * *